United States Patent
Sakai et al.

(10) Patent No.: US 6,186,754 B1
(45) Date of Patent: Feb. 13, 2001

(54) COMPRESSOR HAVING THRUST BEARING MECHANISM

(75) Inventors: Takeshi Sakai, Chiryu; Masafumi Nakashima, Anjo; Hiroyasu Kato, Kariya; Kazuhide Uchida, Hamamatsu, all of (JP)

(73) Assignee: Denso Corporation, Kariya (JP)

( * ) Notice: Under 35 U.S.C. 154(b), the term of this patent shall be extended for 0 days.

(21) Appl. No.: 09/412,588

(22) Filed: Oct. 5, 1999

(30) Foreign Application Priority Data

Oct. 12, 1998 (JP) .................................................. 10-289771
Nov. 27, 1998 (JP) .................................................. 10-337934

(51) Int. Cl.$^7$ ........................................................... F01C 1/02
(52) U.S. Cl. ................................................................ 418/55.1
(58) Field of Search ............................................... 418/55.1

(56) References Cited

U.S. PATENT DOCUMENTS

| | | | |
|---|---|---|---|
| 4,415,318 | * 11/1983 | Butterworth et al. | 418/55.1 |
| 4,460,321 | * 7/1984 | Terauchi | 418/55.1 |
| 4,545,746 | * 10/1985 | Sugimoto et al. | 418/55.1 |
| 4,548,556 | * 10/1985 | Terauchi | 418/55.1 |
| 4,552,517 | * 11/1985 | Shimizu | 418/55.1 |
| 4,589,828 | * 5/1986 | Sato et al. | 418/55.1 |
| 4,934,909 | * 6/1990 | Suzuki et al. | 418/55.1 |

FOREIGN PATENT DOCUMENTS

| | | | |
|---|---|---|---|
| 0049881 | * 4/1982 | (EP) | 418/55.1 |
| 57-148087 | 9/1982 | (JP) . | |
| 57-148091 | * 9/1982 | (JP) | 418/55.1 |
| 61-241479 | * 10/1986 | (JP) | 418/55.1 |
| 62-147070 | * 7/1987 | (JP) | 418/55.1 |
| 63-057887 | * 3/1988 | (JP) | 418/55.1 |
| 63-179186 | * 7/1988 | (JP) | 418/55.1 |
| 2-264173 | 10/1990 | (JP) . | |
| 4-284193 | * 10/1992 | (JP) | 418/55.1 |
| 5-195965 | 8/1993 | (JP) . | |

* cited by examiner

Primary Examiner—Thomas Denion
Assistant Examiner—Theresa Trieu
(74) Attorney, Agent, or Firm—Pillsbury Madison & Sutro LLP

(57) ABSTRACT

A thrust bearing mechanism receives thrust force which is an element force of a compression counter-force acting on a movable scroll member, and which is perpendicular to the orbital direction of the movable scroll member. The thrust bearing mechanism includes plural substantially cylindrically-shaped first and second rollers. The first roller rotates in one direction, and the second roller rotates perpendicularly to the first roller. Thus, the contact surface area of the rollers is larger than that in which spherical rollers receive the thrust force, thereby suppressing the compressor from being enlarged to accommodate increased thrust forces, and improving the reliability and durability of the compressor.

17 Claims, 12 Drawing Sheets

COMPRESSOR HAVING THRUST BEARING MECHANISM

CROSS REFERENCE TO RELATED APPLICATION

This application is based on and incorporates herein by reference Japanese Patent Application Nos. Hei. 10-289771 filed on Oct. 12, 1998 and Hei. 10-337934 filed on Nov. 27, 1998.

BACKGROUND OF THE INVENTION

1. Field of the Invention

The present invention relates to a compressor suitable for use in a super-critical refrigerating cycle in which a discharge pressure of the compressor is higher than a refrigerant critical pressure.

2. Description of Related Art

JP-A-57-148087 discloses a scroll-type compressor used for a refrigerating cycle. In this scroll-type compressor, a spherical roller receives a thrust force. The thrust force is an element force of the compression counter-force acting on a movable scroll, which is perpendicular to the orbital direction of the movable scroll. The spherical roller rolls to support and allow the movable scroll to orbit.

A discharge pressure of a compressor in a super-critical refrigerating cycle is 7–10 times higher than that in a conventional refrigerating cycle using a flon as a refrigerant.

Therefore, when the compressor disclosed in JP-A-57-148087 is applied to the super-critical refrigerating cycle, because a contact surface pressure of the spherical roller is large, the spherical roller and a surface contacting the roller can be damaged, thereby reducing the reliability and durability of the compressor.

To address this problem, it is considerable to enlarge the diameter of the spherical roller can be damaged or the number of rollers increased. However, this causes the compressor to be enlarged.

SUMMARY OF THE INVENTION

An object of the present invention is to suppress an enlargement of a compressor and improve the reliability and durability thereof.

According to a first aspect of the present invention, a thrust bearing mechanism receives a thrust force which is an element force of a compression counter-force acting on a movable member, and which is perpendicular to the orbital direction of the movable member. The thrust bearing mechanism includes a plurality of substantially cylindrically-shaped rollers. The contact surface area of the rollers is larger than that in the prior art in which spherical rollers receive the thrust force. Thus, the rollers and the surface contacting the rollers are efficiently prevented from being damaged, while suppressing the compressor from being enlarged, and improving the reliability and durability of the compressor.

According to a second aspect of the present invention, a thrust bearing mechanism receives a thrust force which is an element force of a compression counter-force acting on a movable scroll member, and which is perpendicular to the orbital direction of the movable scroll member. The thrust bearing mechanism includes a first substantially cylindrically-shaped roller to rotate in one direction, and a second substantially cylindrically-shaped roller to rotate perpendicularly to the first roller. Thus, as in the first aspect of the present invention, the compressor is suppressed from being enlarged, and the reliability and durability of the compressor are improved.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF PREFERRED EMBODIMENTS

First Embodiment

Figure 1:
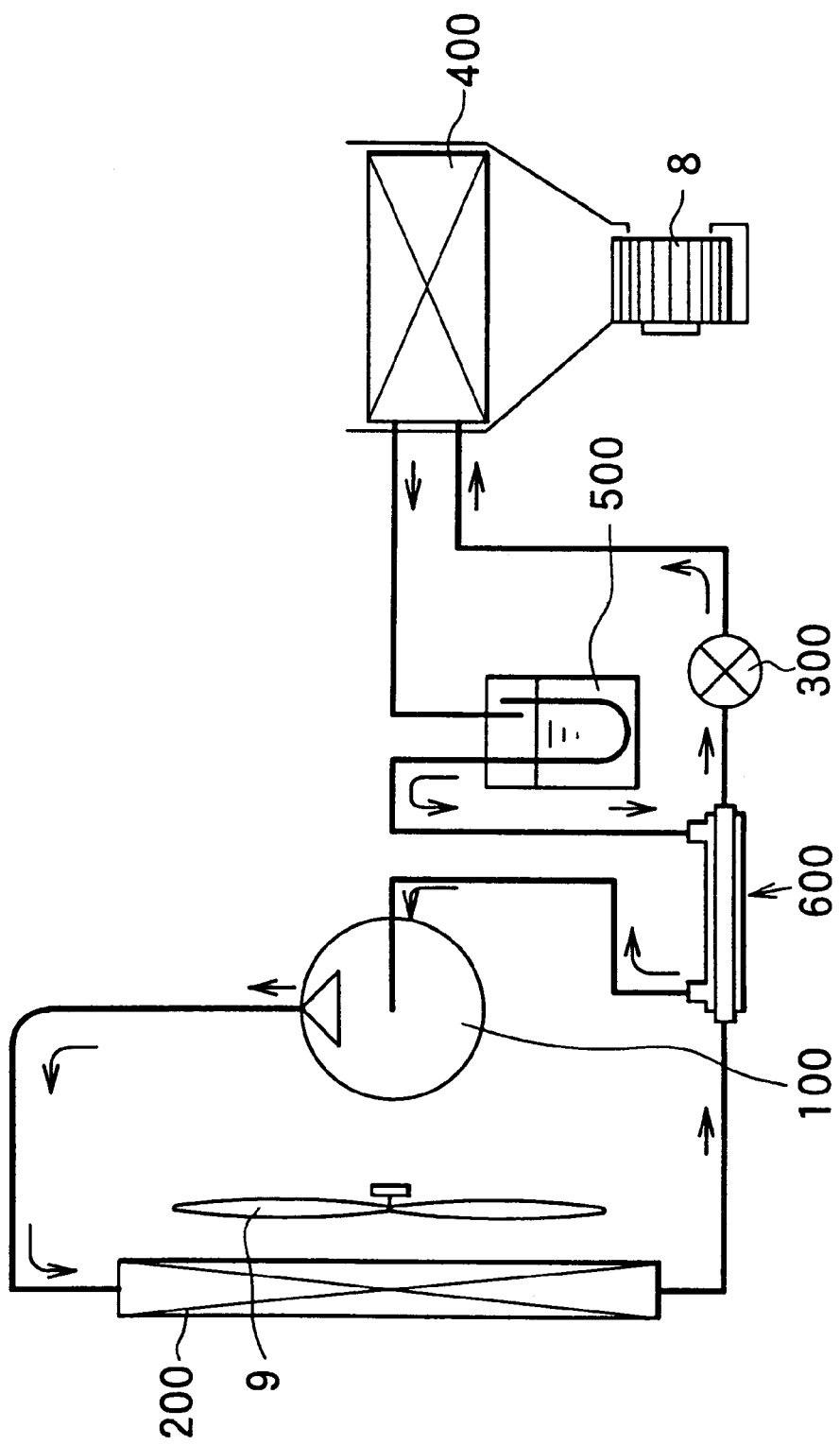
FIG. 1 is a schematic view of a super-critical refrigerating cycle.

In the first embodiment, a compressor 100 is applied to a super-critical refrigerating cycle. FIG. 1 schematically shows a super-critical refrigerating cycle.

The compressor 100 suctions a refrigerant (for example, $CO_2$) and compresses the refrigerant to exceed the critical pressure thereof. A gas cooler 200 radiates the heat of the refrigerant discharged from the compressor 100. In the gas cooler 200, the refrigerant heat is exchanged with an exterior air. A pressure reducer 300 reduces the pressure of the refrigerant flowing from the gas cooler 200, and converts the refrigerant into gas-liquid phase refrigerant. An evaporator 400 evaporates the liquefied refrigerant of the gas-liquid phase refrigerant, and cools an air flowing through the evaporator 400.

The pressure reducer 300 is a pressure control valve disclosed in Japanese Patent Application No. 8-33962.

An accumulator 500 divides the refrigerant into a gas phase refrigerant and a liquid phase refrigerant, and the gas phase refrigerant flows out of the accumulator 500 into a suction side of the compressor 100. In an internal heat exchanger 600, the refrigerant flowing out of the accumulator 500 exchanges heat with the refrigerant flowing out of the gas cooler 200.

Figure 2:
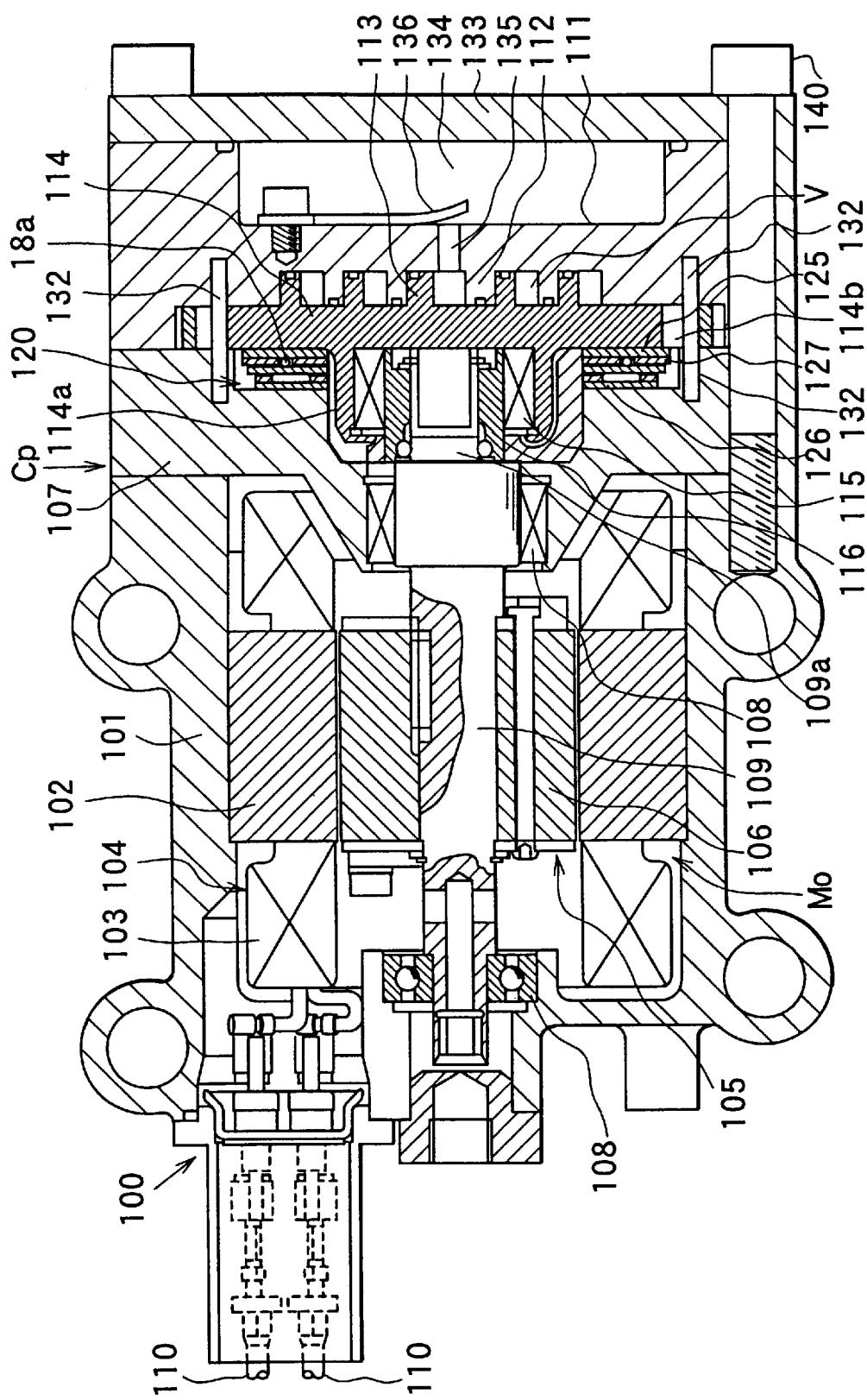
FIG. 2 is a cross-sectional view of a compressor (first embodiment)

FIG. 2 shows an axial cross-sectional view of the compressor 100. This compressor 100 is a concealed type compressor including a scroll-type compression mechanism Cp and an electric motor (in this embodiment, a DC brushless motor) Mo within a compressor housing. The scroll-type compression mechanism Cp suctions and compresses the refrigerant, and the electric motor Mo drives the compression mechanism Cp.

The compressor 100 includes a front housing 101, a yoke 102 and a coil 103. The yoke 102 is made of a magnetic material, such as silicon steel, and is fixed to the front housing 101. The coil 102 is wound around the yoke 102. The yoke 102 and the coil 103 construct a stator coil 104.

A rotor 105 rotates inside the stator coil 104. The rotor 105 includes plural permanent magnets 106 and a shaft 109. The shaft 109 is rotatably supported by the front housing 101 and a middle housing 107 through a bearing 108. A terminal 110 is connected to a motor drive circuit (not illustrated), and supplies an electric current to the stator coil 104.

A shell 111 is fixed to the middle housing 107, and the middle housing 107 and the shell 111 form a space therebetween. The shell includes a spiral tooth 112 protruding toward the middle housing 107.

A movable scroll 114 is disposed between the middle housing 107 and the shell 111. The movable scroll 114 includes a spiral tooth 113 contacting the tooth 112 of the shell 111 to form an operation chamber V. The movable scroll 114 orbits with respect to the shell (fixed scroll) 111 to expand the operation chamber V to suction the refrigerant, and to reduce the operation chamber V to compress the refrigerant.

The movable scroll 114 further includes a boss portion 114a at the center thereof, which is connected to a crank portion 109a of the shaft 109 through a shell type (which has no inner race) needle bearing 115.

The crank portion 109a is formed eccentrically from the rotation center of the shaft 109. Thus, when the shaft 109 rotates, the movable scroll 114 orbits the shaft 109.

A bushing 116 slidably connects the movable scroll 114 to the crank portion 109a, and constructs a follower crank mechanism to increase the contact surface pressure between both teeth 112 and 113. The bushing 116 slightly moves the movable scroll 114 against the crank portion 109a by the movable direction element force of compression counter-force acting on the movable scroll 114, to increase the contact surface pressure between both teeth 112 and 113.

A thrust bearing mechanism 120 is provided between the middle housing 107 and the movable scroll 114. The thrust bearing mechanism 120 receives a thrust force and supports the movable scroll 114, allowing the movable scroll 114 to move orbitally. Here, the thrust force is an element force of the compression counter-force, which is parallel with the shaft 109.

Figure 3:
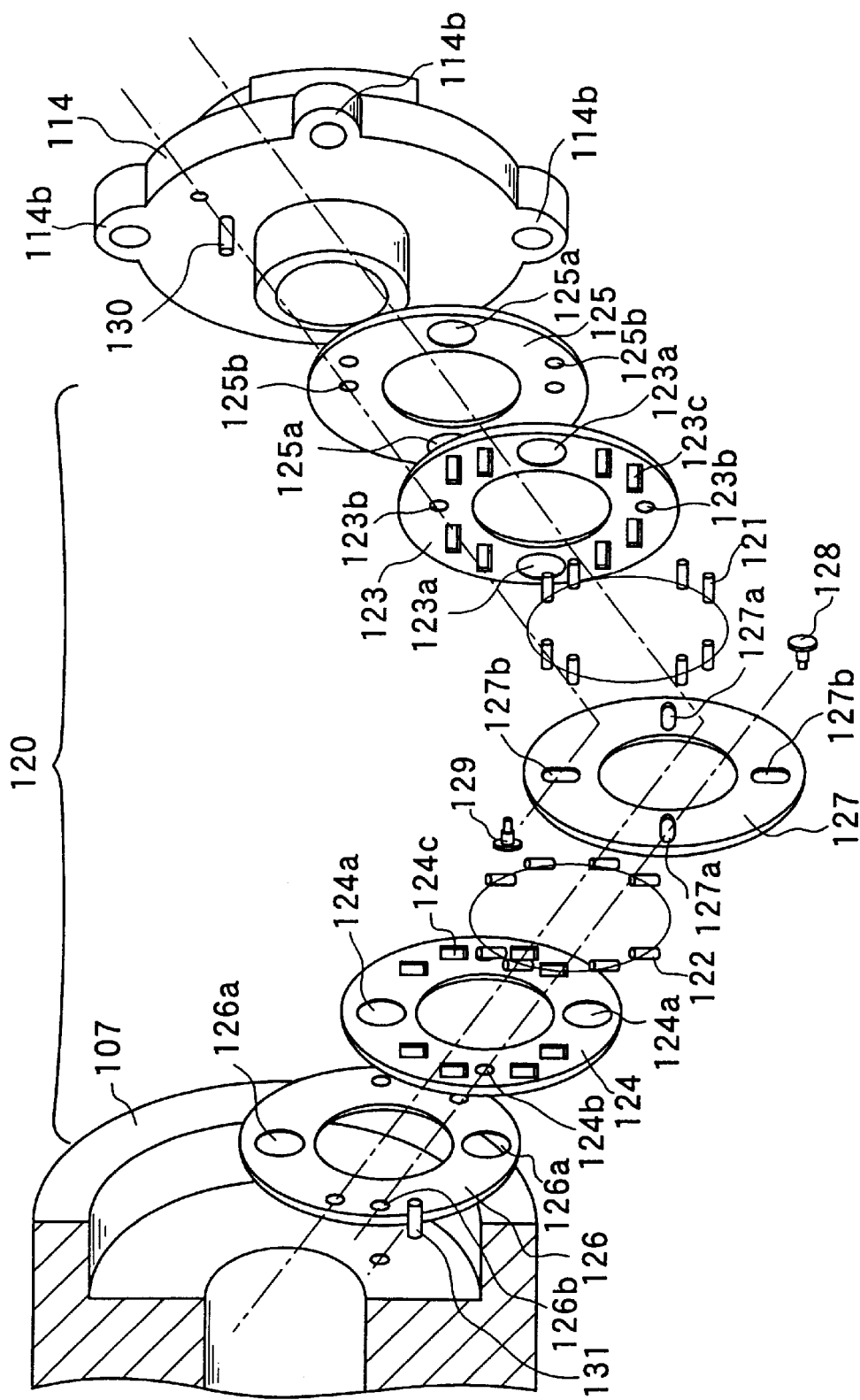
FIG. 3 is a perspective view showing parts of a thrust bearing mechanism (first embodiment)

As shown in FIG. 3, the thrust bearing mechanism 120 includes a first set of cylindrically shaped rollers 121 and a second set of cylindrically shaped rollers 122. The first set of rollers 121 are supported to rotate in one direction (upper and lower direction in FIG. 3), and the second set of rollers 122 are supported to rotate perpendicularly to the first rollers 121. That is, the second set of rollers 122 rotate in the right and left direction in FIG. 3. Here, the first and second set of rollers 121 and 122 may be substantially cylindrical with rounded corners at both ends thereof.

The thrust bearing mechanism 120 further includes a first supporter 123 and a second supporter 124. The first supporter 123 supports the first set of rollers 121 in a first set of support slots 123c thereof, and the second supporter 124 supports the second set of rollers 122 in a second set of support slots 124c.

A ring-like first race plate 125 is provided between the first supporter 123 and the movable scroll 114, and contacts the first set of rollers 121. A ring-like second race plate 126 is provided between the second supporter 124 and the middle housing 107, and contacts the second set of rollers 122. A ring-like third race plate 127 is provided between the first supporter 123 and the second supporter 124, and contacts the first and second set of rollers 121 and 122.

The third race plate 127 includes four oval holes 127a and 127b elongating radially. These oval holes 127a and 127b are formed at 90-degree intervals circumferentially.

The first and second sets of rollers 121 and 122 are made of hot-worked high carbon bearing steel having a surface hardness of $H_RC$ 59–64. The first, second and third race plates 125, 126 and 127 are also made of hot-worked high carbon bearing steel having a surface hardness of $H_RC$ 59–64. The first and second supporters 123 and 124 are made of resin or metal.

An assembling method of the thrust bearing mechanism 120 will next be explained.

The first supporter 123 is fixed to the first race plate 125 by a rivet (not illustrated), and the second supporter 124 is fixed to the second race plate 126 by a rivet.

Figure 4:
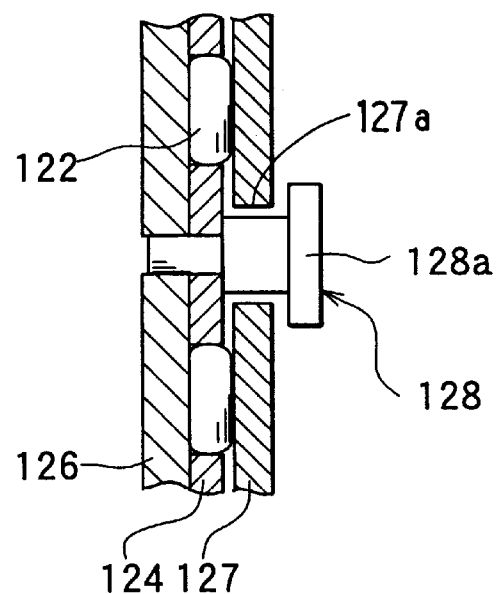
FIG. 4 is a cross-sectional view showing a principal portion of the thrust bearing mechanism (first embodiment)

The second set of rollers 122 are installed in the support slots 124c, and as shown in FIG. 4, a pin 128 is inserted into the oval hole 127a while the third race plate 127 contacts the second set of rollers 122. The tip of the pin 128 is press-inserted into the second supporter 124 and into the second race plate 126.

Figure 5:
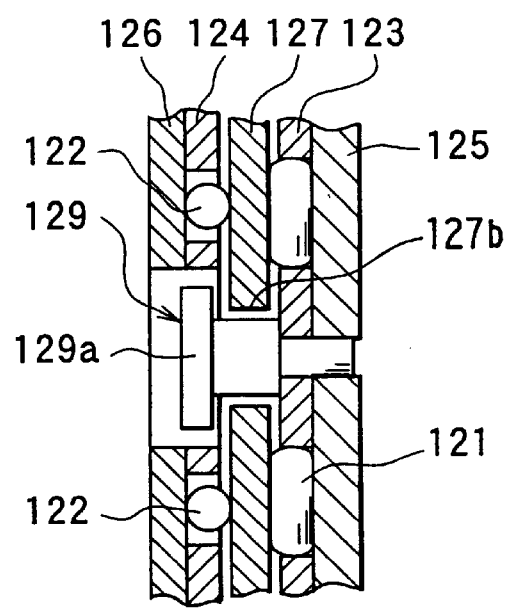
FIG. 5 is a cross-sectional view showing a principal portion of the thrust bearing mechanism (first embodiment)

Similarly, the first set of rollers 121 are installed in the support slots 123c, and as shown in FIG. 5, a pin 129 is inserted into the oval hole 127b while the third race plate 127 contacts the first set of rollers 121. The tip of the pin 129 is press-inserted into the first supporter 123 and into the first race plate 125.

Here, the longitudinal dimensions of the oval holes 127 and 128 are larger than the diameters of the pins 128 and 129. Thus, the third race plate 127 moves freely with respect to the pins 128 and 129.

In FIG. 3, large holes 123a and 125a prevent a pinhead 128a (see FIG. 4) from contacting the first supporter 123 and the first race plate 125, and help the pin 128 to be driven.

Similarly, large holes 124a and 126a prevent a pinhead 129a (see FIG. 5) from contacting the second supporter 124 and the second race plate 126, and help the pin 129 to be driven.

A first fixture pin 130 penetrates through a small hole 123b of the first supporter 123 and a small hole 125b of the first race plate 125, and is press-inserted into the movable scroll 114. The first fixture pin 130 fixes the first race plate 125 to the movable scroll 114.

Similarly, a second fixture pin 131 penetrates through a small hole 124b of the second supporter 124 and a small hole 126b of the second race plate 126, and is press-inserted into the middle housing 107. The second fixture pin 131 fixes the second race plate 126 to the middle housing 107.

Therefore, the movable scroll 114, the first supporter 123 and the first race plate 125 can move integrally in the rotation direction of the first set of rollers 121 (the longitudinal direction of the oval hole 127b) with respect to the third race plate 127. The third race plate 127 can move in the rotation direction of the second set of rollers 122 (the longitudinal direction of the oval hole 127a) with respect to the middle housing 107. Thus, the movable scroll 114 can move in parallel with the middle housing 107 and the shell 111 without rotating with respect to the crank portion 109a.

As shown in FIG. 2, a rotation prevention pin 132 is installed in the middle housing 107 and the shell 111. The rotation prevention pin 132 prevents the movable scroll 114 from rotating with respect to the crank portion 109a. The rotation prevention pin 132 slidably contacts the inner wall of a ring hole 114b (see FIG. 3) formed at a radially outer area of the movable scroll 114. Thus, when the shaft 109 rotates, the movable scroll 114 orbits with respect to the rotation center of the shaft 109 without rotating around the crank portion 109a.

A rear housing 133 and the shell 111 form a discharge chamber 134. The discharge chamber 134 reduces the pressure pulsation of the refrigerant discharged from the operation chamber V. The rear housing 133 and the shell 111 are fixed to the middle housing 107 by a bolt 140.

A discharge port 135 is formed in the shell 111, and allows the operation chamber V to communicate with the discharge chamber 134. A reed-type discharge valve (not illustrated) and a valve stop 136 restricting the maximum opening degree of the reed valve are provided at the discharge chamber 134 side of the discharge port 135.

The operation of the compressor 100 in the present embodiment now will be explained.

According to the present embodiment, the thrust bearing mechanism 120 includes the plural cylindrically shaped first and second sets of rollers 121 and 122. Thus, the contact surface area of the rollers 121 and 122 are larger than that in the prior art. Thus, the first and second sets of rollers 121 and 122 efficiently prevent the first, second and third race plates 125, 126 and 127 from being damaged, thereby suppressing enlargement of the compressor 100 to accommodate the increased forces and improving the reliability and durability of the compressor 100.

Further, the first rollers 121 and the second rollers 122 rotate perpendicularly to each other. Thus, the movable scroll 114 orbits with respect to the middle housing 107 more smoothly than that in which an angle between rotation directions of the first and second rollers 121 and 122 is less than 90 degree. Therefore, the movable scroll 114 efficiently orbits with a small mechanical energy loss, thereby improving the efficiency of the compressor 100.

Second Embodiment

Figure 6:
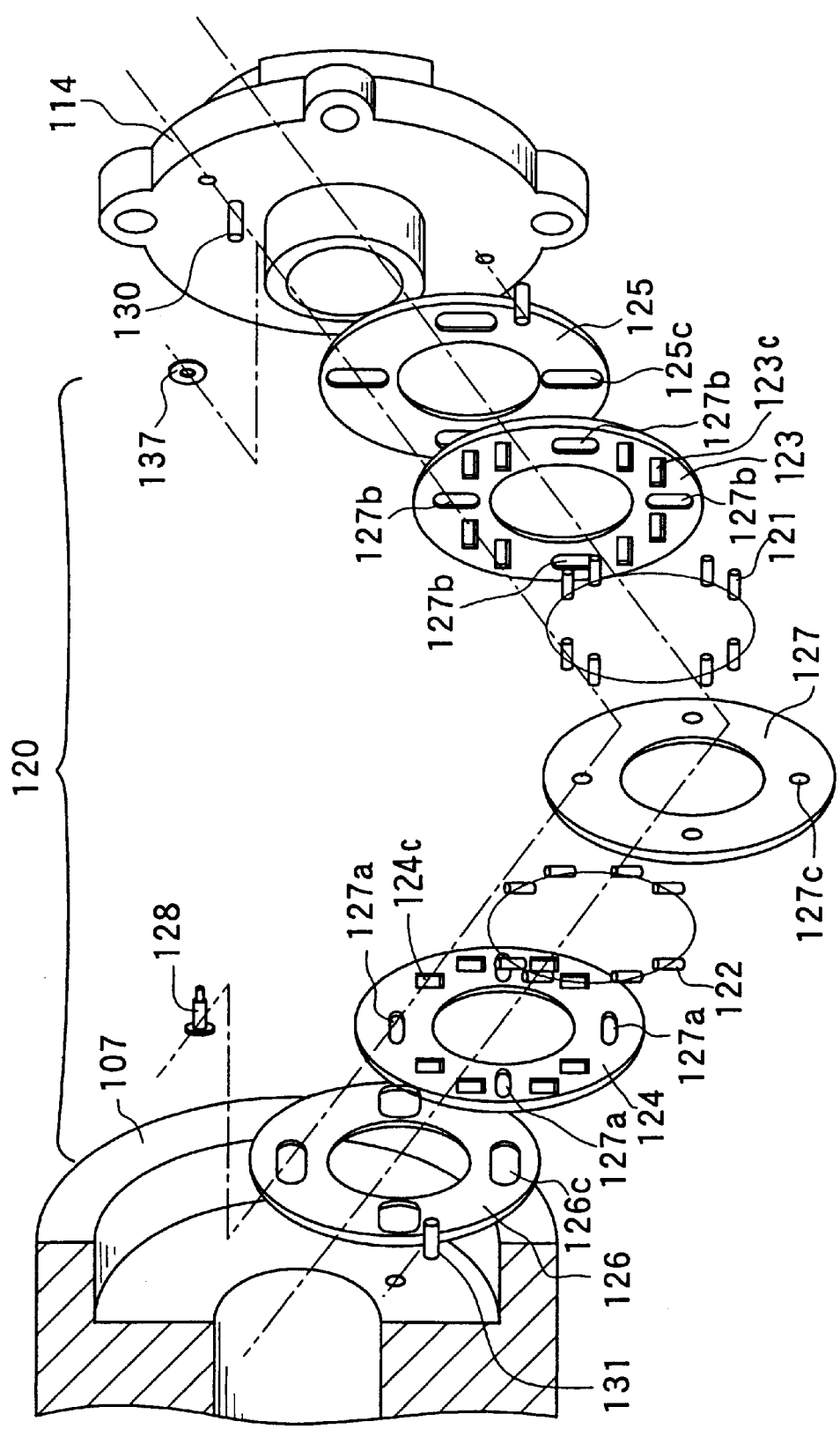
FIG. 6 is a perspective view showing parts of the thrust bearing mechanism (second embodiment)
Figure 7:
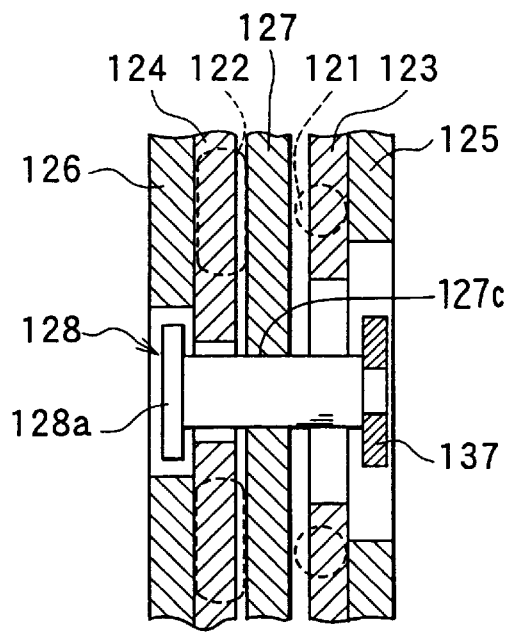
FIG. 7 is a cross-sectional view showing a principal portion of the thrust bearing mechanism (second embodiment)

In the second embodiment, as shown in FIGS. 6 and 7, the pin 128 is press-inserted into the third race plate 127 to be allowed to move with respect to the first and second race plates 125 and 126.

In the same way as in the first embodiment, the first supporter 123 is fixed to the first race plate 125 by a rivet, and the second supporter 124 is fixed to the second race plate 126 by a rivet. However, the pin 128 is press-inserted into the third race plate 127 as shown in FIG. 7.

Here, the tip of the pin 128 (the opposite end of the pinhead 128a) is press-inserted or welded into a ring-like plate 137. Thus, the pin head 128a prevents the second supporter 124 and the second race plate 126 from slipping out from the pin 128, and the ring-like plate 137 prevents the first supporter 123 and the first race plate 125 from slipping out from the pin 128.

As shown in FIG. 6, the first and second supporters 123 and 124 each include four oval holes 127b and 127a respectively. Thus, the first and second race plates 125 and 126 are restricted in their movable direction relative to the third race plate 127.

Here, the third race plate 127 includes an insertion hole 127c into which the pin 128 is press-inserted. The first race plate 125 includes an oval hole 125c to prevent the plate 137 from contacting the first race plate 125. The second race plate 126 includes an oval hole 126c to prevent the pinhead 128a from contacting the second race plate 126.

Third Embodiment

Figure 8:
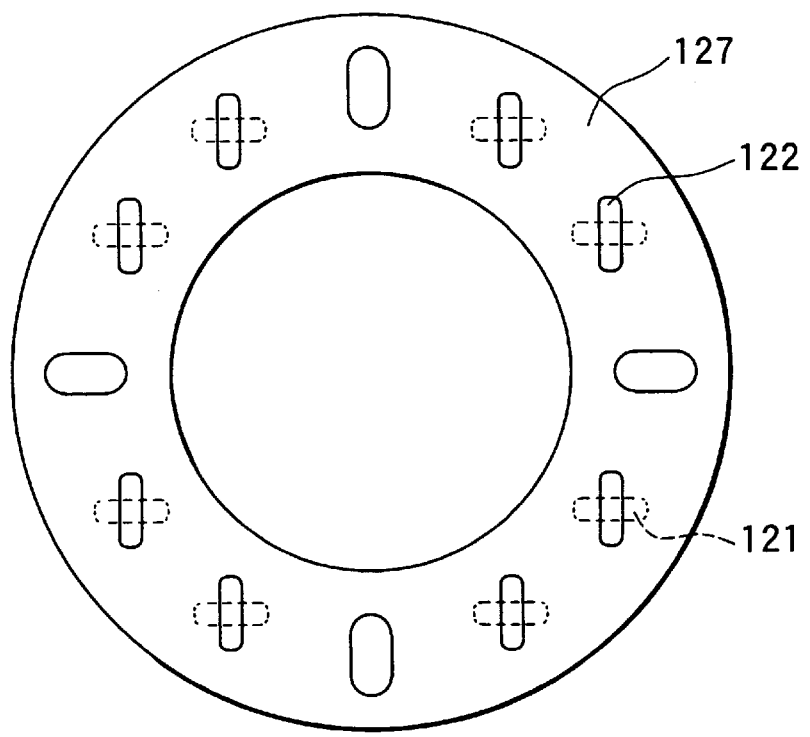
FIG. 8 is a plan view of a third race plate viewing from an axial direction, for explaining a thrust bearing mechanism (third embodiment)
Figure 9:
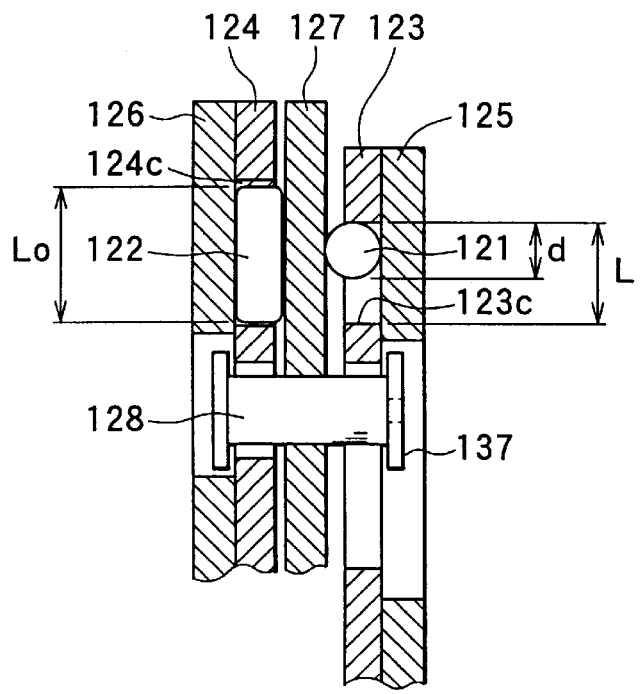
FIG. 9 is a cross-sectional view showing a principal portion of the thrust bearing mechanism (third embodiment)
Figure 10:
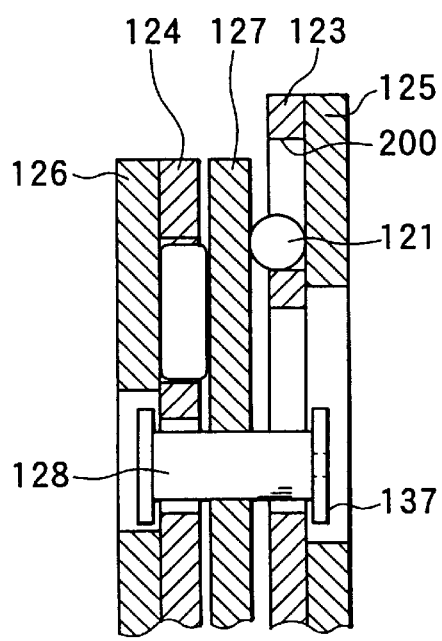
FIG. 10 is a cross-sectional view showing a principal portion of the thrust bearing mechanism (third embodiment)

In the third embodiment, as shown in FIGS. 8–10, the rollers 121 and 122 are positioned such as to overlap each other when viewed from the axial direction of shaft 109 even while the movable scroll 114 orbits.

The longitudinal dimensions Lo of both rollers 121 and 122 are set such that surface pressures at the contact surfaces between rollers 121, 122 and each race plate 125–127 are less than a predetermined surface pressure for preventing elements 121, 122, 125, 126 and 127 from being damaged, and are greater than the orbital radius of the movable scroll 114.

Therefore, when the thrust force acts on the first roller 121, because a bending moment does not act on the third race plate 127, the third race plate 127 does not bend. Thus, the thickness of the third race plate 127 can be reduced, and the mechanical strength against the thrust force and the reliability (durability) of the third race plate 127 is improved.

Lengths L of the first and second support slots 123c and 124c in the rotational directions of the first and second rollers 121 and 122, which are perpendicular to the longitudinal directions of the first and second rollers 121 and 122, are set such that the inner walls of the first and second support slots 123c and 124c do not contact the outer walls of the first and second rollers 121 and 122. That is, the lengths L are set at substantially the orbital radius of the movable scroll 114 plus the diameter d of the rollers 121 and 122.

Thereby, the rollers 121 and 122 smoothly rotate without sliding against the first through third race plates 125–127, thereby preventing both rollers 121 and 122 from partially wearing. Thus, the reliability and durability of both rollers 121 and 122 (thrust bearing mechanism 120) is improved.

Fourth Embodiment

Figure 11:
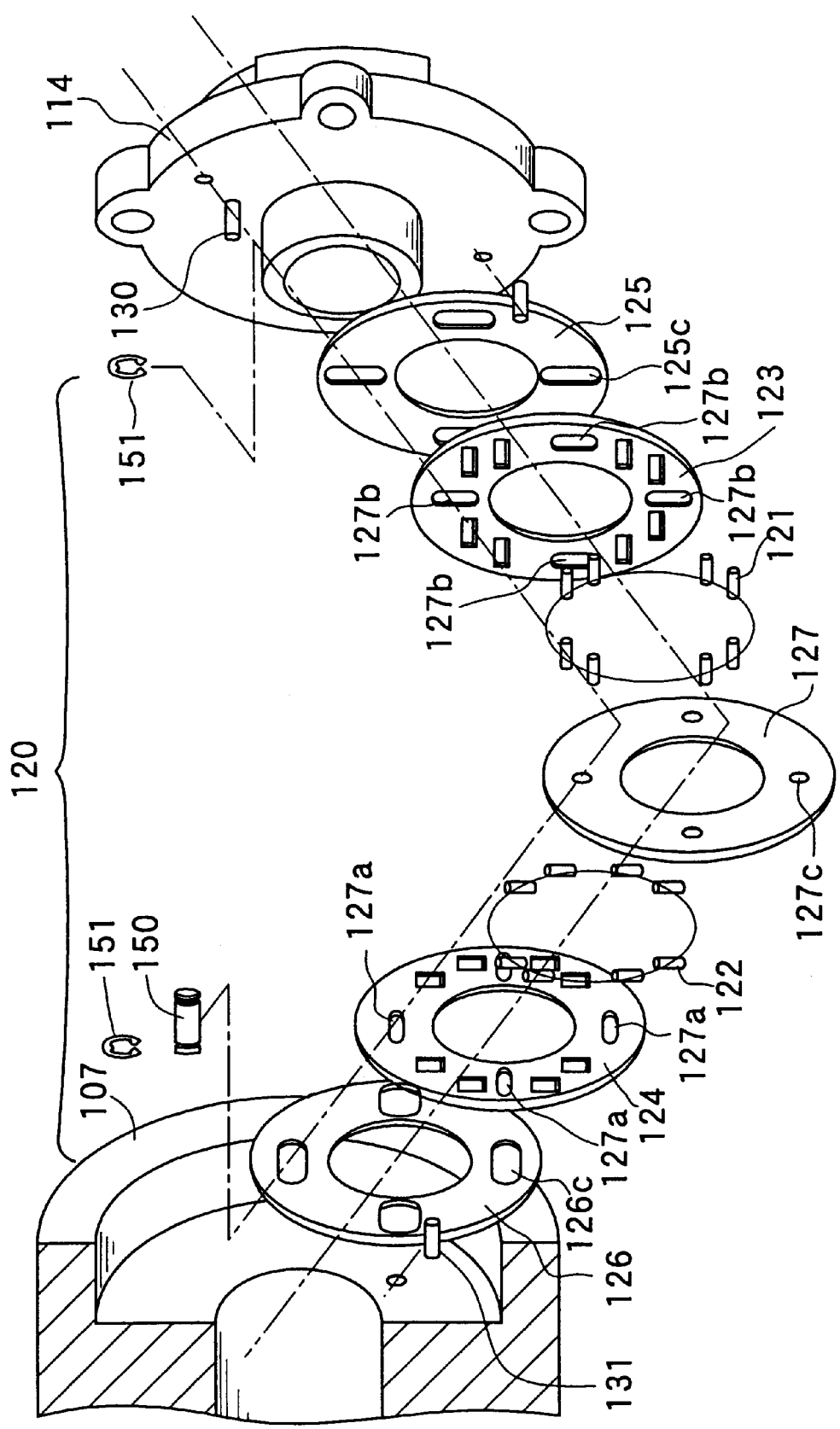
FIG. 11 is a perspective view showing parts of the thrust bearing mechanism (fourth embodiment)
Figure 12:
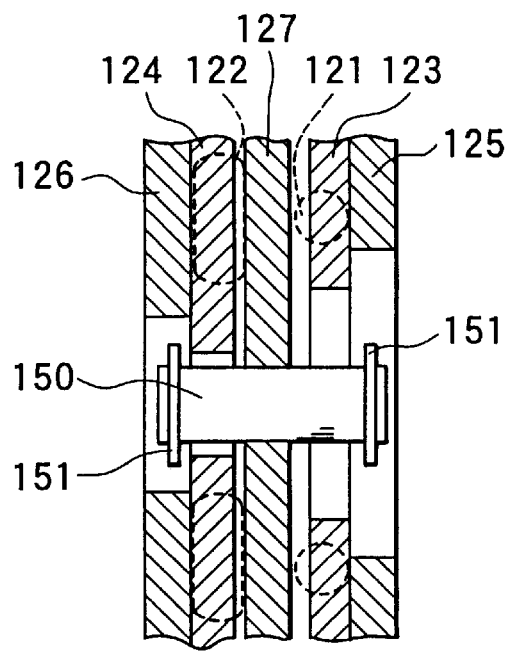
FIG. 12 is a cross-sectional view showing a principal portion of the thrust bearing mechanism (fourth embodiment)

In the fourth embodiment, as shown in FIGS. 11 and 12, a cylindrical pin 150, which has no pin head like the pins 128 and 129 in the first through third embodiments, fastens the supporters 123, 124 and the third race plate 127 together. A C or E-shaped stop ring 151 is provided at both longitudinal ends of the cylindrical pin 150 to prevent the pin 150 from slipping out of the thrust bearing mechanism 120.

Here, the thrust force is received by the first through third race plates 125–127 and the first and second rollers 121 and 122. Thus, a force caused by the compression counter-force does not substantially act on the pin 150, and the pin 150 can be prevented from slipping out by the stop ring 151.

Thereby, according to the fourth embodiment, the pin 150 is more easily assembled and disassembled than that in the first through third embodiments in which the pins 128 and 129 are press-inserted into the first and second race plates 125 and 126.

Fifth Embodiment

Figure 14:
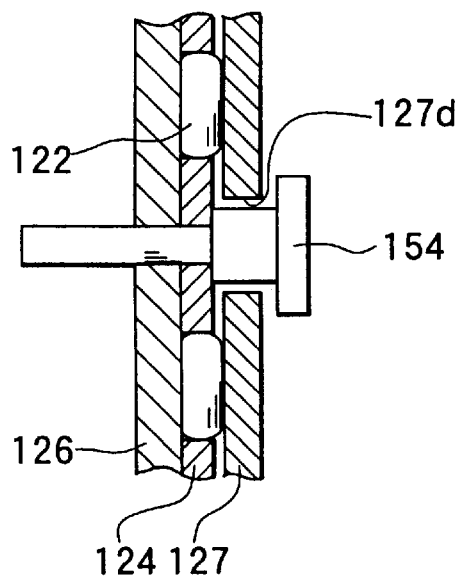
FIG. 14 is a cross-sectional view showing a principal portion of the thrust bearing mechanism (fifth embodiment)
Figure 15:
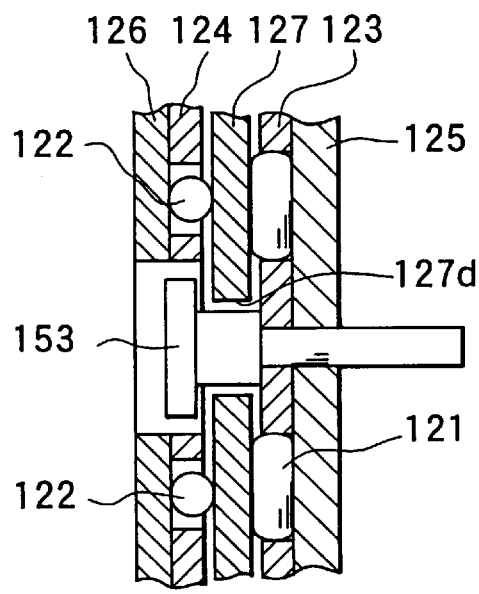
FIG. 15 is a cross-sectional view showing a principal portion of the thrust bearing mechanism (fifth embodiment)
Figure 13:
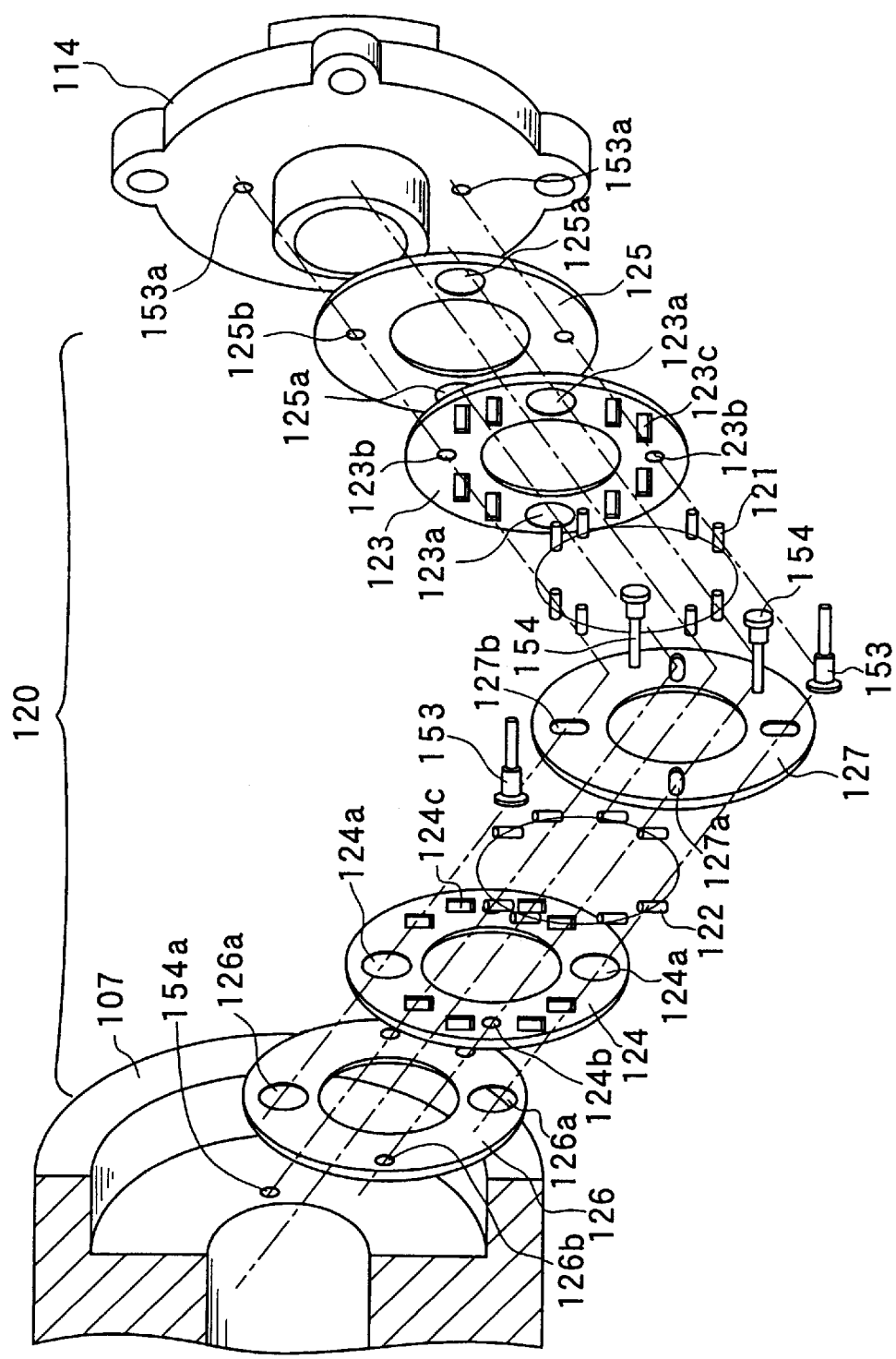
FIG. 13 a perspective view showing parts of the thrust bearing mechanism (fifth embodiment)

In the fifth embodiment, as shown in FIGS. 13–15, the first and second supporters 123, 124 and the third race plates 127 are fixed to the movable scroll 114 and the middle housing 107 by first pins 153 and second pins 154. The tip end (opposite the pin head) of each first pin 153 is extended and, as shown in FIG. 13, is inserted into a bore 153a of the movable scroll 114 to fix the thrust bearing mechanism 120 to the movable scroll 114. Similarly, the tip end of each second pin 154 is extended, and is inserted into a bore 154a of the middle housing 107 to fix the thrust bearing mechanism 120 to the middle housing 107.

Therefore, the thrust bearing mechanism 120 is simply fixed to the movable scroll 114 and the middle housing 107 without using the first and second fixture pins 131 and 132 as in the above-described first through fourth embodiments. Thus, the number of parts of the thrust bearing 120 and the processes for manufacturing the same are reduced, thereby reducing the manufacturing cost of the compressor 100.

Here, each first pin 153 is, as shown in FIG. 15, press-inserted into the first supporter 123 and the first race plates 125, and each second pin 154 is, as shown in FIG. 14, press-inserted into the second supporter 124 and the second race plates 126. The third race plate 127 includes oval holes 127a and 127b having a diameter larger than the orbital diameter of the movable scroll 114 (see FIG. 13), and the pins 153 and 154 penetrate through the oval holes 127a and 127b, respectively.

Sixth Embodiment

Figure 16:
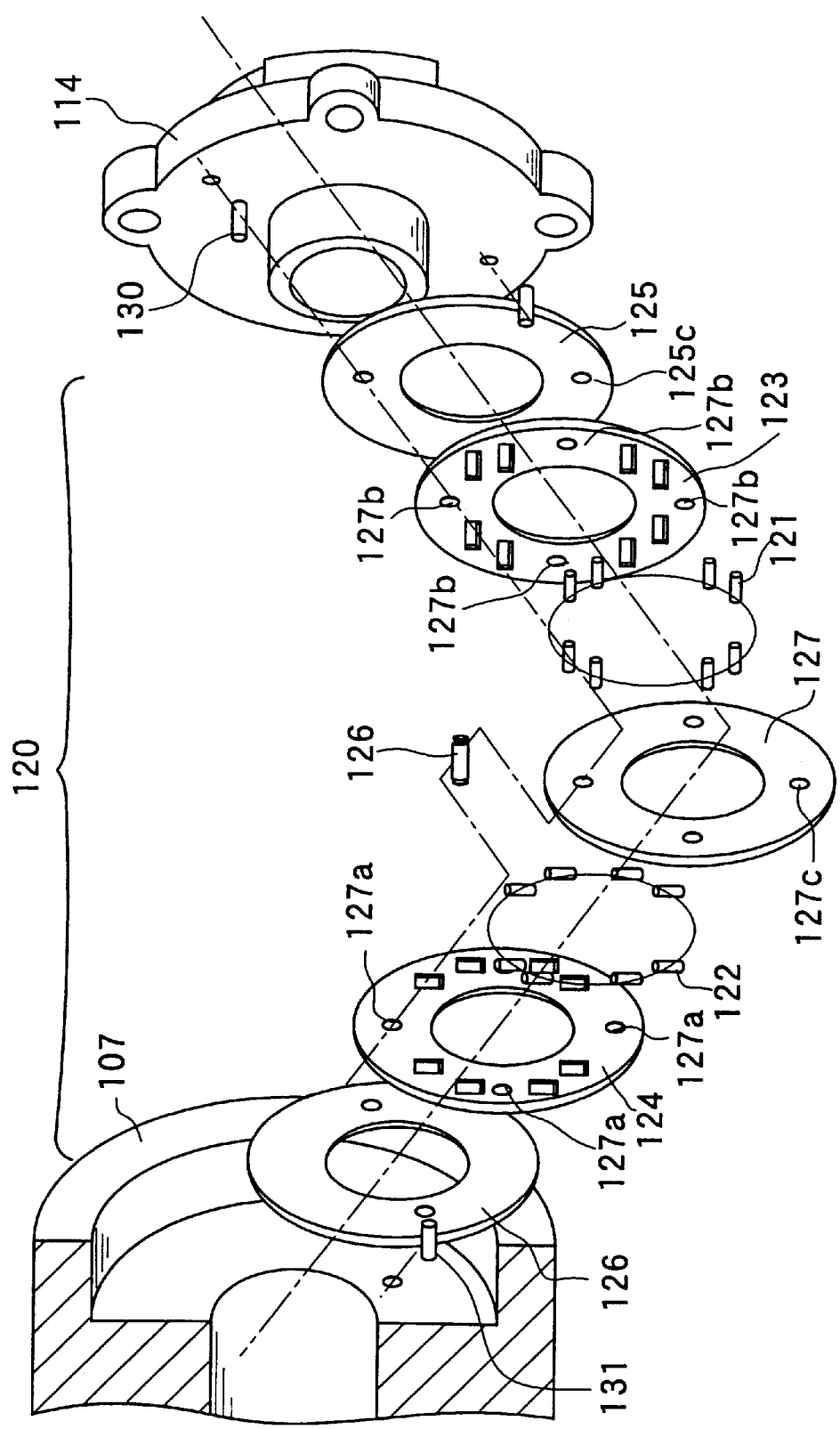
FIG. 16 is a perspective view showing parts of the thrust bearing mechanism (sixth embodiment)

FIG. 16 is a perspective view showing parts of the thrust bearing mechanism 120 according to the sixth embodiment. In the sixth embodiment, as shown in FIGS. 17–20, a retention flange 155 is formed in each roller supports slot of the supporters 123 and 124. The retention flanges 155 prevent the rollers 121 and 122 from slipping-out from the supporters 123 and 124 before assembling the first and second race plates 125 and 126.

Figure 17:
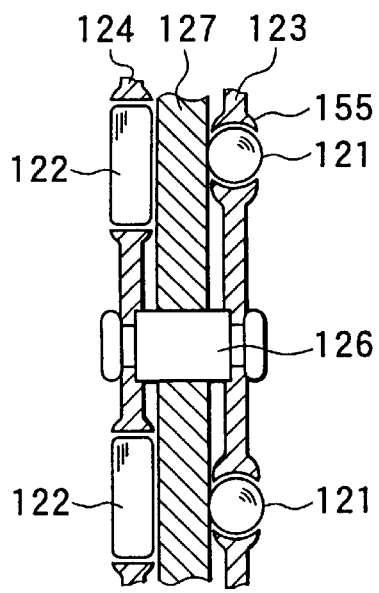
FIG. 17 is a cross-sectional view showing a principal portion of the thrust bearing mechanism (sixth embodiment)
Figure 18:
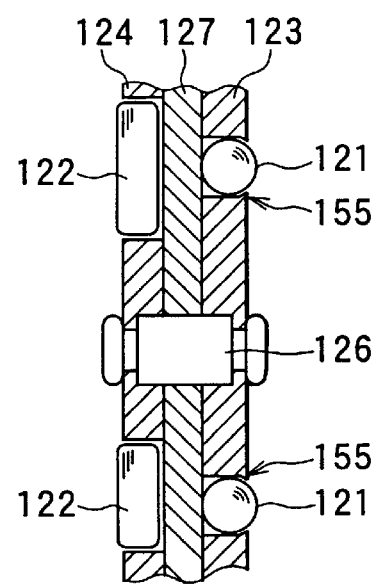
FIG. 18 is a cross-sectional view showing a principal portion of the thrust bearing mechanism (sixth embodiment)
Figure 19:
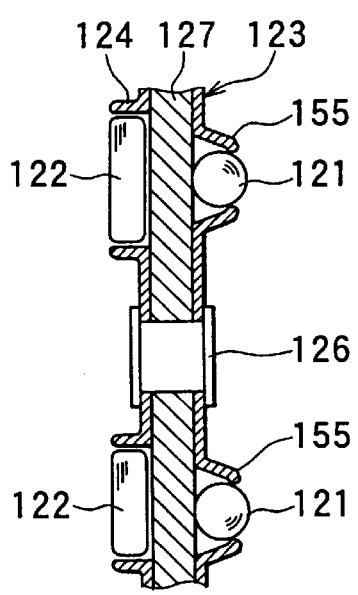
FIG. 19 is a cross-sectional view showing a principal portion of the thrust bearing mechanism (sixth embodiment)
Figure 20:
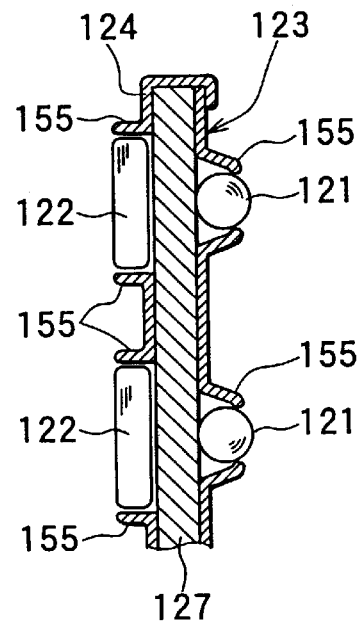
FIG. 20 is a cross-sectional view showing a principal portion of the thrust bearing mechanism (sixth embodiment).

FIG. 17 shows a first example where the supporters 123 and 124 are made of resin, with integral retention flanges 155. FIG. 18 shows a second example where the supporters 123 and 124 are made of metal, with integral retention flanges 155. FIGS. 19 and 20 show a third example where a metal plate is press-formed into the supporters 123, 124 and include the retention flanges 155. In these three examples, both supporters 123 and 124 are fixed to the third race plate 127 by a pin 126.

Modifications

In the above-described embodiments, the present invention is applied to a scroll-type compressor. The present invention is not restricted to the scroll-type compressor and alternatively may be applied to other type compressors, such as a rolling piston type compressor.

In the above-described embodiments, the present invention is applied to a concealed-type compressor having an electric motor Mo and a scroll-type compression mechanism Cp within a compressor housing. The present invention is not restricted to the concealed-type compressor and alternatively may be applied to an open-type compressor in which the electric motor Mo and the compression mechanism are separated.

In the above-described embodiments, the present invention is applied to a compressor for a super-critical refrigerating cycle using $CO_2$ as refrigerant. The present invention is not restricted to the $CO_2$ super-critical refrigerating cycle, and alternatively may be applied to another super-critical heat pump cycle or refrigerating cycle using ethylene, ethane or nitrogen oxide as refrigerant, and may also be applied to a conventional refrigerating cycle using flon (HFC134a) as refrigerant.

In the above-described embodiments, the rotation prevention mechanism is a pin-ring type rotation prevention mechanism including a rotation prevention pin 132 and a ring portion 114b. However, alternatively another rotation prevention mechanism may be applied.

Further, in the above-described embodiments, the rotation prevention mechanism is provided outside the thrust bearing mechanism 120. However, the rotation prevention mechanism may be alternatively provided inside the thrust bearing mechanism 120. In this case, the rotation prevention pin 132 can be removed.

In the above-described embodiments, the first supporter 123 is fixed to the first race plate 125, and the second supporter 124 is fixed to the second race plate 126. However, the first and second supporters 123 and 124 may be alternatively fixed to the third race plate 127.

In the above-described embodiments, the first and second sets of rollers 121 and 122 rotate substantially perpendicularly to each other. The present invention is not restricted to this, it is sufficient that the rotation directions of these rollers 121 and 122 cross each other, i.e. are not parallel to each other.

What is claimed is:

1. A compressor to compress fluid comprising:
    a housing forming an outer casing;
    a shell fixed to said housing;
    a movable member forming an operation chamber with said shell, said movable member orbiting with respect to said shell to expand and reduce the volume of said operation chamber; and
    a thrust bearing mechanism supporting said movable member while allowing said movable member to orbit, said thrust bearing mechanism receiving a thrust force which is an element force of a compression counter-force acting on said movable member, and which is perpendicular to the orbital direction of said movable member, said thrust bearing mechanism including a plurality of substantially cylindrically-shaped rollers.

2. A compressor to compress fluid according to claim 1, wherein said plurality of rollers include at least one first roller to rotate in one direction and at least one second roller to rotate in another direction.

3. A compressor to compress fluid according to claim 2, wherein said one direction is perpendicular to said another direction.

4. A compressor to compress fluid according to claim 2, said plurality of rollers include a plurality of first rollers and a plurality of second rollers.

5. A compressor to compress fluid according to claim 2, wherein said first and second rollers are positioned such as to overlap each other when viewed from a direction of the thrust force.

6. A scroll-type compressor to compress fluid comprising:
   a housing forming an outer casing;
   a scroll-type compression mechanism provided in said housing for suctioning and compressing said fluid, said scroll-type compression mechanism including a fixed scroll member fixed to said housing and a movable scroll member orbiting with respect to said fixed scroll member; and
   a thrust bearing mechanism supporting said movable scroll member while allowing said movable scroll member to orbit, said thrust bearing mechanism receiving a thrust force which is an element force of a compression counter-force acting on said movable scroll member, and which is perpendicular to the orbital direction of said movable scroll member, said thrust bearing mechanism including a plurality of substantially cylindrically-shaped rollers.

7. A scroll-type compressor to compress fluid according to claim 6, wherein said plurality of rollers include at least one first roller to rotate in one direction and at least one second roller to rotate in another direction.

8. A scroll-type compressor to compress fluid according to claim 7, wherein said one direction is perpendicular to said another direction.

9. A scroll-type compressor to compress fluid according to claim 7, wherein said plurality of rollers include a plurality of first rollers and a plurality of second rollers.

10. A scroll-type compressor according to claim 6, said thrust bearing mechanism further including:
    a first supporter supporting said first roller, said first supporter having a first support slot into which said first roller is installed; and
    a second supporter supporting said second roller, said second supporter having a second support slot into which said second roller is installed.

11. A scroll-type compressor to compress fluid according to claim 10, wherein
    lengths of said first and second support slots in the rotational directions of said first and second rollers are set such that inner walls of said first and second support slots do not contact outer walls of said first and second rollers.

12. A scroll-type compressor to compress fluid according to claim 10, wherein
    lengths of said first and second support slots in the rotational directions of said first and second rollers are set larger than the orbital radius of said movable scroll member.

13. A scroll-type compressor to compress fluid according to claim 12, wherein said plurality of rollers include a plurality of first rollers and a plurality of second rollers.

14. A scroll-type compressor to compress fluid according to claim 10, wherein said thrust bearing mechanism further includes a race plate provided between said first and second supporters, and contacting said first and second rollers.

15. A scroll-type compressor to compress fluid according to claim 14, wherein said thrust bearing mechanism further includes:
    a pin penetrating through said first and second supporters and said race plate to support said first and second supporters and said race plate together; and
    a stop-ring attached to both longitudinal ends of said pin to prevent said pin from slipping-out of said thrust bearing mechanism.

16. A scroll-type compressor to compress fluid according to claim 14, wherein said thrust bearing mechanism further includes:
    a first pin penetrating through said first supporter and said race plate to support said first supporter and said race plate together, a tip end of said first pin inserted into said movable scroll member; and
    a second pin penetrating through said second supporter and said race plate to support said second supporter and said race plate together, a tip end of said second pin inserted into said housing, wherein
    said first pin moves in said one direction with respect to said race plate, and
    said second pin moves in said another direction with respect to said race plate.

17. A scroll-type compressor to compress fluid according to claim 10, wherein said first and second supporters each further include a retention mechanism to prevent said first and second rollers from slipping-out of said first and second supporters, respectively.

* * * * *